US008127057B2

(12) United States Patent
Chung et al.

(10) Patent No.: US 8,127,057 B2
(45) Date of Patent: Feb. 28, 2012

(54) MULTI-LEVEL BUFFERING OF TRANSACTIONAL DATA

(75) Inventors: Jaewoong Chung, Bellevue, WA (US); David S. Christie, Austin, TX (US); Michael P. Hohmuth, Dresden (DE); Stephan Diestelhorst, Dresden (DE); Martin Pohlack, Dresden (DE)

(73) Assignee: Advanced Micro Devices, Inc., Austin, TX (US)

( * ) Notice: Subject to any disclaimer, the term of this patent is extended or adjusted under 35 U.S.C. 154(b) by 117 days.

(21) Appl. No.: 12/627,956

(22) Filed: Nov. 30, 2009

(65) Prior Publication Data

US 2011/0040906 A1    Feb. 17, 2011

Related U.S. Application Data

(60) Provisional application No. 61/233,808, filed on Aug. 13, 2009.

(51) Int. Cl.
*G06F 13/12* (2006.01)
(52) U.S. Cl. ............................................. 710/52; 710/57
(58) Field of Classification Search .................... 710/52, 710/57
See application file for complete search history.

(56) References Cited

U.S. PATENT DOCUMENTS

| 7,395,382 | B1 | 7/2008 | Moir |
| 7,516,365 | B2 | 4/2009 | Lev |
| 2004/0187115 | A1 | 9/2004 | Tremblay et al. |
| 2006/0085588 | A1* | 4/2006 | Rajwar et al. ................. 711/100 |
| 2007/0239942 | A1 | 10/2007 | Rajwar et al. |
| 2008/0005504 | A1* | 1/2008 | Barnes et al. ................. 711/156 |

OTHER PUBLICATIONS

Austen McDonald, JaeWoong Chung, Hassan Chafi, Chi Cao Minh, Brian D. Carlstrom, Lance Hammond, Christos Kozyrakis, Kunle Olukotun, "Characterization of TCC on Chip-Multiprocessors", In the Proceedings of the Fourteenth International Conference on Parallel Architectures and Compilation Techniques, Sep. 2005, 12 pages.
Dave Dice, Yossi Lev, Mark Moir, Daniel Nussbaum, "Early Experience with a Commercial Hardware Transactional Memory Implementation", Proceeding of the 14th International Conference on Architectural support for programming Languages and Operating Systems, 2009, 12 pages.
Colin Blundell, Joe Devietti, E. Christopher Lewis, Milo M. K. Martin, "Making the Fast Case Common and the Uncommon Case Simple in Unbounded Transactional Memory", ISCA 2007, 11 pages.

(Continued)

*Primary Examiner* — Chun-Kuan Lee
*Assistant Examiner* — David Martinez
(74) *Attorney, Agent, or Firm* — Williams, Morgan & Amerson, P.C.

(57) ABSTRACT

An apparatus, method, and system for implementing a hardware transactional memory (HTM) system with multiple levels of transactional buffers. The apparatus comprises a data cache configured to buffer data in a shared (by a plurality of processing cores) memory accessed by speculative memory access operations and to retain the data during at least a portion of an attempt to execute the atomic memory transaction. The apparatus also comprises an overflow detection circuit configured to detect an overflow condition upon determining that the data cache has insufficient capacity to buffer a portion of data accessed as part of the atomic memory transaction, as well as a buffering circuit configured to respond to the detection of the overflow condition by preventing the portion of data from being buffered in the data cache and buffering the portion of data in a secondary buffer separate from the data cache.

20 Claims, 7 Drawing Sheets

OTHER PUBLICATIONS

B. Saha, A.R. Adl-Tabatabai, and Q. Jacobson, "Architectural Support for Software Transactional Memory", In Proceedings of the 39th Annual IEEE/ACM International Symposium on Microarchitecture, Dec. 2006, 12 pages.

M. Herlihy, J. E. B. Moss, "Transactional Memory: Architectural Support for Lock-Free Data Structures", In Proceedings of the 20th Annual International Symposium Computer Architecture, May 1993, 12 pages.

C. S. Ananian, K. Asanovic, B. C. Kuszmaul, C. E. Leiserson, and S. Lie, "Unbounded Transactional Memory", In Proceedings of the 11th Symposium High-Performance Computer Architecture, Feb. 2005, 11 pages.

L. Hammond, V. Wong, M. Chen, B. D. Carlstrom, J. D. Davis, B. Hertzberg, M. K. Prabhu, H. Wijaya, C. Kozyrakis, and K. Olukotun, "Transactional Memory Coherence and Consistency", In Proceedings of the 31st Annual International Symposium Computer Architecture, Jun. 2004, 12 pages.

K.E. Moore, J. Bobba, M.J. Moravan, M.D. Hill, and D.A. Wood, "LogTM:Log-Based Transactional Memory", In Proceedings of the 12th Annual International Symposium High Performance ComputerArchitecture, Feb. 2006, 12 pages.

W. Chuang, S. Narayanasamy, G. Venkatesh, J. Sampson, M.V. Biesbrouck, G. Pokam, B. Calder, and O. Colavin, "Un-Bounded Page-Based Transactional Memory", In Proceedings of the 12th International Conference on Architectural Support for Programming Languages and Operating Systems, Oct. 2006, 12 pages.

V. Krishnan and J. Torrellas, "A Chip Multi Processor Architecture with Speculative Multithreading," IEEE Transactions on Computers, Special Issue on Multi-threaded Architecture, Sep. 1999, 15 pages.

U.S. Appl. No. 11/591,919, filed Nov. 2, 2006, entitled "System and Method for Supporting Multiple Alternative Methods for Executing Transactions", 56 pages.

U.S. Appl. No. 11/742,106, filed Apr. 30, 2007, entitled "Efficient Hardware Scheme to Support Cross-Cluster Transactional Memory", 71 pages.

U.S. Appl. No. 11/694,323, filed Mar. 30, 2007, entitled "Coordinating Synchronization Mechanisms using Transactional Memory", 50 pages.

U.S. Appl. No. 11/967,371, filed Dec. 31, 2007, entitled "System and Method for Supporting Phased Transactional Memory Modes", 89 pages.

U.S. Appl. No. 12/238,172, filed Sep. 25, 2008, entitled "System and Method for Integrating Best Effort Hardware Mechanisms for Supporting Transactional Memory", 59 pages.

U.S. Appl. No. 12/324,109, filed Nov. 26, 2008, entitled "Method and System for Hardware Feedback in Transactional Memory", 44 pages.

JaeWoong Chung, Chi Cao Minh, Brian D. Carlstrom, and Christos Kozyrakis, "Parallelizing SPECjbb2000 with Transactional Memory", Computer Systems Laboratory, 2006, 8 pages.

Austen McDonald, JaeWoong Chung, Brian D. Carlstrom, Chi Cao Minh, Hassan Chafi, Christos Kozyrakis and Kunle Olukotun, "Architectural Semantics for Practical Transactional Memory," Computer Systems Laboratory, Stanford University, Proceedings of the 33rd International Symposium on Computer Architecture, 2006, 12 pages.

* cited by examiner

MULTI-LEVEL BUFFERING OF TRANSACTIONAL DATA

This application claims benefit of priority to U.S. Provisional Patent Application No. 61/233,808, filed Aug. 13, 2009. The preceding provisional application is incorporated herein by reference in its entirety. To the extent that material in the Provisional Application conflicts with material expressly set forth herein, the material expressly set forth herein controls.

BACKGROUND

Hardware Transactional Memory (HTM) is a mechanism in computer architecture for supporting parallel programming. With HTM, programmers may simply declare a group of instructions as a transaction and the HTM system may then guarantee that the instructions in the transaction are executed in an atomic and isolated way. Atomicity means that all the instructions of the transaction are executed as a single atomic block with respect to all other concurrent threads of execution. Isolation means that no intermediate result of the transaction is exposed to the rest of the system until the transaction completes. HTM systems may allow transactions to run in parallel as long as they do not conflict. Two transactions may conflict when they both access the same memory area and either of the two transactions writes to that memory area.

To support atomicity and isolation, some HTM approaches involve modifying the cache structure to manage transactional data and metadata. For example, in some HTM systems one or more "dirty" bits are added to each cache line to indicate when the data in the cache line has been accessed by an active transaction. For atomicity, cache data that has been modified by a transaction may be buffered in the cache as speculative data values and marked as dirty. If the transaction succeeds, then the speculative data is written to shared memory and if the transaction aborts (e.g., due to conflict), the speculative values are discarded.

For isolation, a cache-coherence protocol may be used to facilitate consistency between the values seen by various concurrent threads and/or processors in the system. Cache coherence messages, also known as probes, may be exchanged between various physical and/or logical processors in response to any of the processors reading and/or writing data to shared memory. In some systems, a processor may detect conflicts by checking whether different types of incoming probes concern transactionally-accessed data buffered in cache.

While the cache-based transaction buffer design described above may be efficient in providing a large transaction buffer at low additional hardware cost, it is very inefficient in providing a minimum guarantee for supported transaction size (i.e., number of different memory addresses accessed by a single transaction). For example, consider a cache-based transaction buffer implemented on a 4-way set-associative cache. If a transaction accesses five different memory bytes, each of which is buffered in a different cache line of the same associativity set, then at least one of the cache lines with transactional data must be evicted from this set. In other words, the cache-based transactional buffer overflows. Thus, the cache-based transaction buffer may fail to support a transaction with a memory footprint of only 5 bytes.

Such shortcomings of cache-based transactional buffers pose significant challenges to application programmers who are forced to design applications in a manner that accommodates a given processor's small minimum guaranteed transaction size.

SUMMARY

The apparatus comprises a data cache configured to buffer data accessed at respective locations in a shared memory by respective ones of a plurality of speculative memory access operations and to retain the data during at least a portion of an attempt to execute the atomic memory transaction, wherein the shared memory is shared by a plurality of processing cores. The apparatus also comprises an overflow detection circuit configured to detect an overflow condition upon determining that the data cache has insufficient capacity to buffer a portion of data accessed as part of the atomic memory transaction and a buffering circuit configured to respond to the detection of the overflow condition by preventing the portion of data from being buffered in the data cache and buffering the portion of data in a secondary buffer separate from the data cache.

In some embodiments, the secondary buffer may be implemented as part of a load, store, and/or load/store queue. In such embodiments, buffering the portion of data may include preventing results from one or more memory access operations from being flushed to the data cache, such as by preventing one or more pointers of the queue from being modified.

In some embodiments, different portions of data may be buffered in different secondary buffers. For example, in some instances, if the primary buffer has insufficient capacity to buffer the portion of data and the portion of data is not speculative (i.e., was not accessed by a speculative memory operation), a bypass circuit may be utilized to buffer the portion of data in a secondary buffer implemented by a second data cache at a higher level of a hierarchy than is the data cache. In some embodiments, the second data cache may or may not be configured to buffer speculative data.

Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

A minimum guarantee of transactional memory support may be defined as the amount of memory (e.g., number of bytes) or memory locations that a hardware transactional memory (HTM) implementation guarantees that a transaction can access without causing a transaction buffer overflow. A transaction buffer may, for example, be a hardware buffer where speculative data written by a transaction is buffered before being atomically flushed to memory when the transaction commits.

Traditionally, transactional buffers have been implemented as extensions of first-level data caches. One drawback of this approach is that such designs often provide only very small minimum guarantees of supported transaction size (e.g., equal to the level of associativity of the data cache). To program processors with such small guarantees, programmers must spend considerable time making transactional programs small enough to meet the minimum guarantee, significantly increasing programming difficulty.

Various embodiments of a transactional buffer design disclosed herein may provide larger minimum transaction size guarantees by buffering speculative data in multiple buffers. In various embodiments, at least two different buffers may be employed for providing such expanded transactional support by cooperatively buffering speculative data values. For example, in some embodiments, an overflow detection circuit may detect when insufficient capacity exists in a primary buffer and in response, a buffering circuit may be configured to cause a given portion of transactional data to be buffered in a secondary buffer (e.g., a load/store queue).

Figure 1:
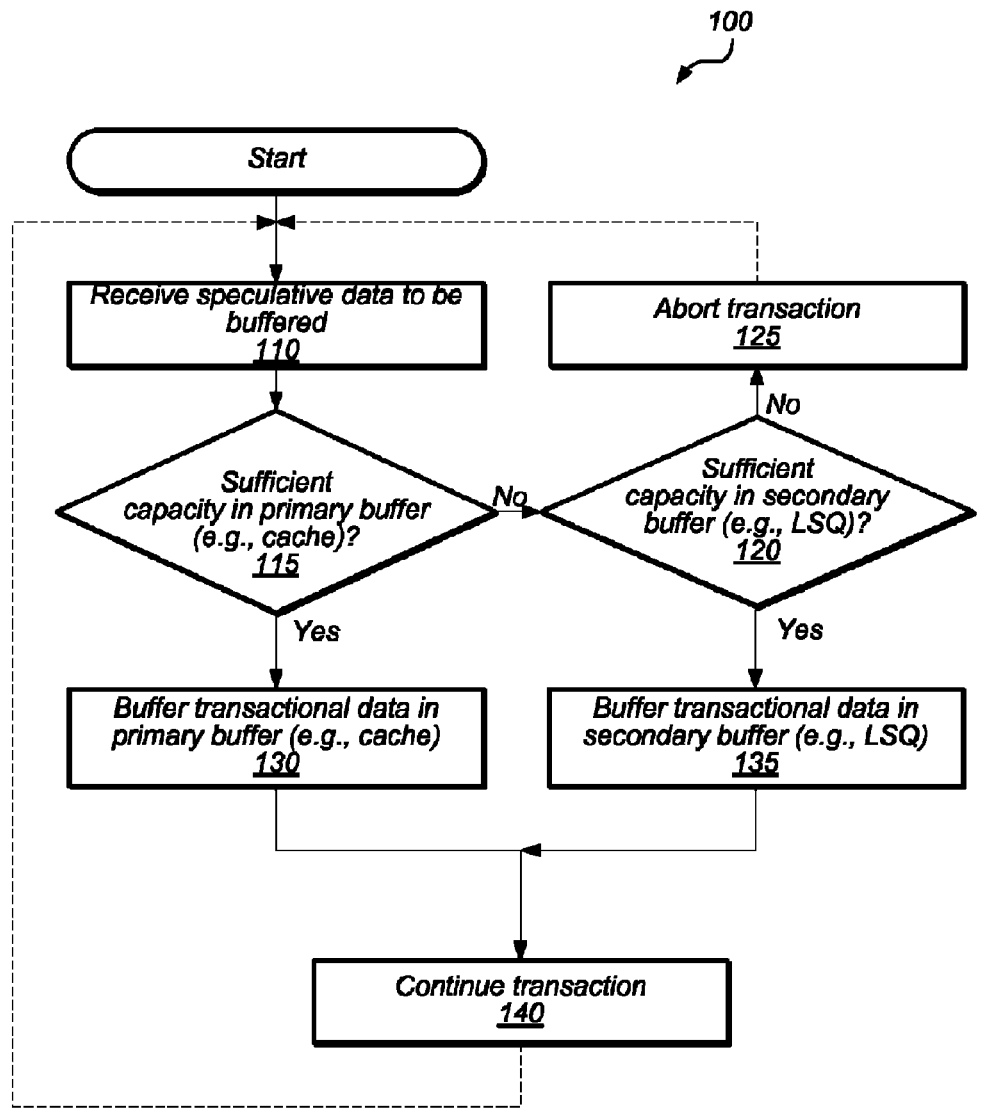
FIG. 1 is a flow diagram illustrating a method for buffering transactional data using a data cache and a secondary overflow buffer in a cooperative manner, according to some embodiments.

FIG. 1 is a flow diagram illustrating one embodiment of a method for buffering transactional data using a data cache and a secondary overflow buffer in a cooperative manner. The method may be executed by one or more hardware circuits of a computer processor.

Embodiments described herein are described, in many instances, by referring to only one processing core within a processor (e.g., a single piece of silicon or chip). Such descriptions are not intended to limit the disclosure, however. In practice, each processor may contain multiple processing cores, each capable, for example, of executing a different thread of execution concurrently. Given the benefit of this disclosure, those skilled in the art will appreciate that the systems and techniques described herein for multi-level transactional buffering may be applied in systems having a single multi-core processor, multiple single-core processors, multiple multi-core processors, etc.

According to the illustrated embodiment, method 100 begins by receiving or detecting speculative data to buffer, as in 110. As used herein, the terms speculative data or transactional data are used interchangeably to refer to any data read and/or written by a transaction in an atomic manner, that is, data accessed by one or more speculative memory access operations of the transaction. A transactional memory system may be configured to facilitate the execution of all such speculative memory operations in a given transaction as a single atomic transaction.

In some embodiments, every memory operation of a transaction may be speculative, and therefore, every value read from and/or written to shared-memory by a transaction may be considered speculative data. In this case, all of the memory operations of a transaction may be executed as a single atomic block. When the transaction commits, any speculative data that have been modified by the execution may be written together to shared-memory.

In other embodiments, only a subset of memory locations accessed within a transaction may be considered speculative. For example, in such embodiments, a programmer may specify that a particular subset of memory operations are to be performed atomically by the transaction, while a different subset (e.g., all other memory operations in the transaction) should be performed in a normal, non-atomic, mode of operation. In some embodiments, a program may specify that all memory access operations that access a given speculative location should be performed speculatively.

In some embodiments, receiving speculative data to be buffered, as in 110, may be performed as part of executing a speculative memory access operation. For example, performing a speculative store operation in a transaction may include buffering the data to be stored, in a speculative buffer. In 110, this data may be received by the speculative buffering subsystem of the HTM. In another example, receiving the speculative data in 110 may be performed as part of executing a read operation. In this case, the speculative data may be that read from shared-memory and/or simply the location of the value read.

According to method 100, after receiving the speculative data to be buffered, as in 110, the system may determine whether the data can be buffered in a primary buffer. For example, in some embodiments, the primary buffer may be a cache-based buffer as described above. In this case, the system may determine whether sufficient capacity exists in the cache to buffer the received data, as in 115. Buffering the speculative data in cache may include inserting the data into the cache and/or marking the data as speculative in the cache.

In some cache designs, inserting data into the cache causes other data to be evicted from the cache (i.e., removed from the data cache and stored in memory at a higher level of the cache hierarchy). For example, if the data cache is an L1 data cache, a higher-level of the memory hierarchy may be an L2 cache. The choice of which data to evict may be a function of several factors, including the particular eviction policy of the cache, the level of set associativity of the cache, the memory address of the data to be inserted, and/or other considerations. For example, in an N-way set associative cache, the memory address of new data is used to determine a corresponding set of N possible locations in the cache into which the data can be inserted. In order to insert the new data, the cache may be configured to evict at least one of the other N entries in the set.

In some embodiments, a cache's eviction policy may stipulate that speculative data may not be evicted from the cache while the transaction that buffered it is still active (e.g., not committed or aborted). Therefore, during the course of executing a transaction, a situation may arise in which a cache has insufficient capacity to buffer additional speculative data. For example, if buffering a new portion of speculative data would require evicting other speculative data from the cache, the cache has insufficient capacity for buffering the new speculative data. The condition where a buffer does not have sufficient capacity to buffer a given portion of additional speculative data is referred to herein as a "buffer overflow condition".

As used herein, reference to "insufficient capacity" or a determination of "insufficient capacity" means that the cache cannot buffer the data without violating one or more caching policies. Depending on the particular cache implementation, caching policies may include those governing the mapping of data to cache blocks (e.g., associativity), rules relating to the eviction of speculative data (e.g., speculative data of an active transaction may not be evicted), and/or other rules by which the data cache operates.

The term "insufficient capacity" does not necessarily imply that the cache has no space for storing additional speculative data, but rather that it cannot buffer a given portion of speculative data without violating a storage policy, as described above. For instance, if an N-way set associative cache stores speculative data in all N entries of a given associative set, then it has insufficient capacity to buffer additional speculative data in that set if doing so would require evicting other speculative data resident in the set. However, the cache may have sufficient capacity to buffer other speculative data that maps to a different associative set, where one or more entries in the different associative set do not contain speculative data.

According to the illustrated embodiment, if the primary buffer (e.g., cache) has sufficient capacity to buffer the speculative data, as indicated by the affirmative exit from 115, then the primary buffer buffers the transactional data, as in 130, and the transaction continues, as in 140. Continuing the transaction may include executing more speculative memory access operations, which may cause the method to be repeated, as indicated by the dotted line from 140 to 110.

However, if the primary buffer (e.g., cache) cannot (i.e., has insufficient capacity to) buffer the speculative data, as indicated by the negative exit from 115, then the method comprises determining whether the data can be buffered in a secondary buffer, as in 120. For example, in some embodiments, a load, store, or combined load/store queue may be used as a secondary buffer as described below.

According to the illustrated embodiment of FIG. 1, if the secondary buffer does have sufficient capacity for buffering the speculative data, as indicated by the affirmative exit from 120, then the data is buffered in the secondary buffer (as in 135), and the transaction continues execution, as in 140. Again, continuing execution may include performing one or more subsequent memory access operations, which may include re-executing method 100 for new speculative data, as indicated by the dotted line from 140 to 110.

In method 100, if the secondary buffer does not have sufficient capacity to buffer the speculative data, as indicated by the negative exit from 120, then the transaction is aborted, as in 125. Aborting the transaction may include releasing and/or discarding speculative data from the primary and secondary buffers. After aborting the transaction, the transaction may be reattempted. In this case, the method may be repeated, as indicated by the dotted line from 125 to 110. While the method of FIG. 1 assumes that the system is described with reference to only two transactional buffers, in various embodiments, different numbers of buffers may be used.

Figure 2:
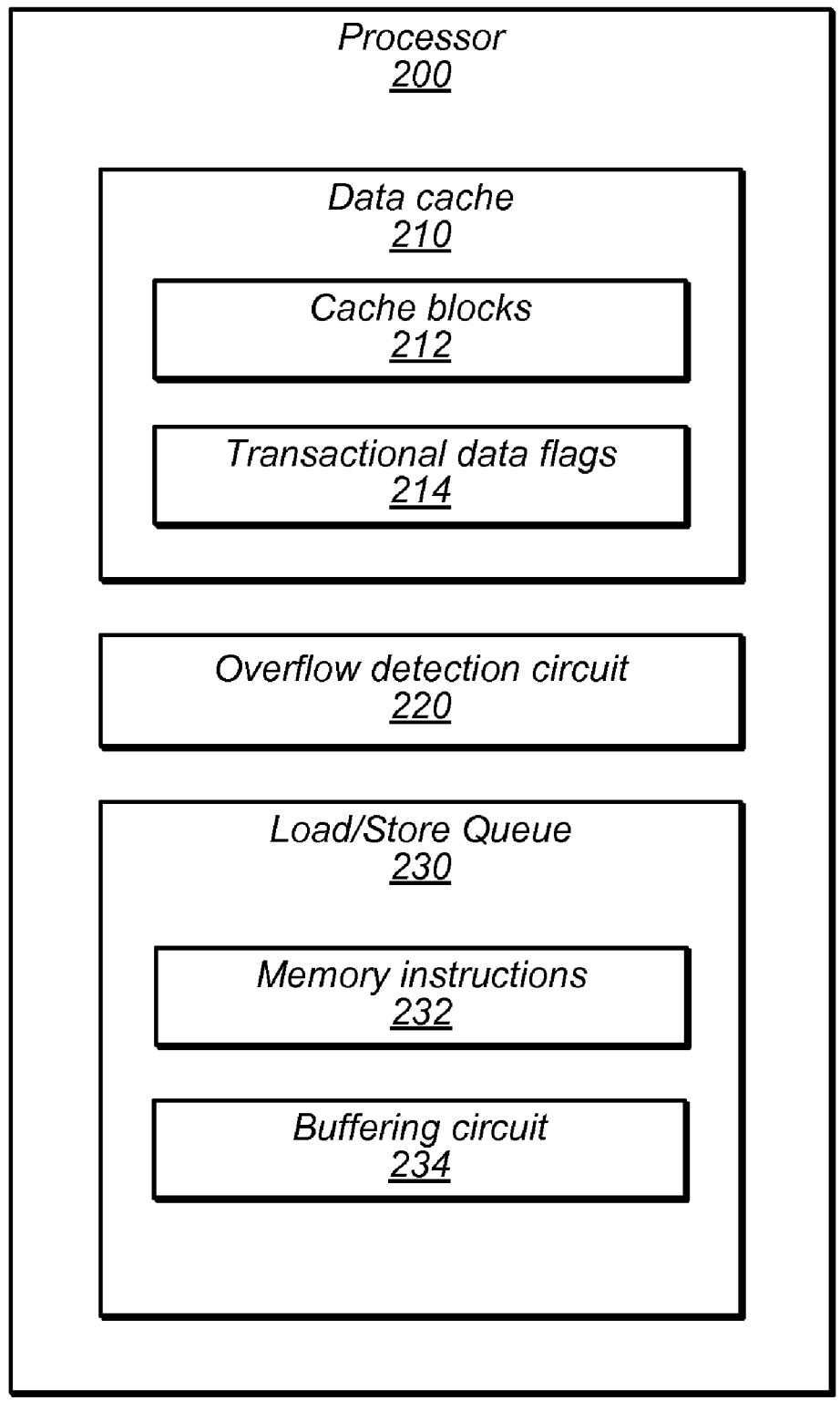
FIG. 2 is a block diagram illustrating the components of a processor configured to implement transactional buffering using primary and secondary buffers, according to some embodiments.

FIG. 2 is a block diagram illustrating the components of a processor configured to implement transactional buffering using primary and secondary buffers, according to some embodiments. The illustrated processor may be used to implement method 100 using a data cache as a primary buffer and a load/store queue as a secondary buffer.

In FIG. 2, processor 200 includes data cache 210, which may be configured to cache data from recently accessed shared memory locations and to implement a transactional buffer for buffering speculative data accessed by various transactions. Data cache 210 may therefore include any number of cache blocks 212 (i.e., cache lines) for caching data.

Data cache 210 may include transactional data flags 214, which may indicate which of the data in cache blocks 210 (if any) is speculative data.

According to the illustrated embodiment, processor 200 may further include overflow detection circuit 220, which may be usable to indicate whether the data cache has sufficient capacity to buffer given speculative data. For example, if data cache 210 were set associative, then overflow detection circuit 220 may be configured to determine that insufficient capacity exists in data cache 210 for buffering a set of speculative data if the set of speculative data maps to a set of cache blocks 212 that is already full of other speculative data.

Processor 200 may further include a load/store queue 230. Load/store queue (LSQ) 230 may hold in-flight memory instructions that have not yet been completed and/or have not yet been flushed to the cache. For example, in some embodiments, a memory operation may first be issued to the load/store queue, where it progresses through the stages of execution before the result is eventually flushed to data cache 210. In some embodiments, load/store queue 230 may be subdivided into separate structures for implementing a separate load queue and store queue mechanisms.

Load/store queue 230 may therefore hold a plurality of memory instructions 323, any number of which may be speculative. In some embodiments, before flushing a result of a speculative memory instruction to cache 210, load/store queue 230 may be configured to utilize overflow detection circuit 220 to determine whether data cache 210 has sufficient capacity to buffer the result of the speculative memory instruction. For example, if the instruction is a speculative store operation to a given memory location, then overflow detection circuit 220 may be usable by elements of load/store queue 230 to determine whether the data stored by the speculative store operation can be buffered in data cache 210 as speculative data.

As in method 100, if overflow detection unit 220 determines that sufficient capacity exists in data cache 210, then the processor may flush the result of the speculative instruction to data cache 210. For example, flushing the result may include removing the speculative instruction from instructions 232, buffering the result data in cache blocks 212, and setting transactional data flags 214 to indicate that the inserted data is speculative data.

However, if overflow detection circuit 220 determines that the data cache has insufficient capacity to store speculative data, then load/store queue 230 may utilize buffering circuit 234 to buffer the speculative data. One example of how this may be done is discussed below with relation to FIG. 4.

In some embodiments, since speculative data may be buffered both in data cache 210 as well as in load/store queue 230, cache coherence probes received from other processors may be evaluated against data in both of these buffers. For example, if an invalidating probe is received from another processor (i.e., indicating that the other processor has modified a value in shared memory), then conflict detection mechanisms on processor 200 (not shown in FIG. 2) may check both data cache 210 and load/store queue 230 to determine whether speculative values corresponding to the shared memory location exist in either buffer. If this is the case, then the transaction actively being executed by the processor (i.e., the transaction for which the speculative data is being buffered) may be aborted.

Figure 3:
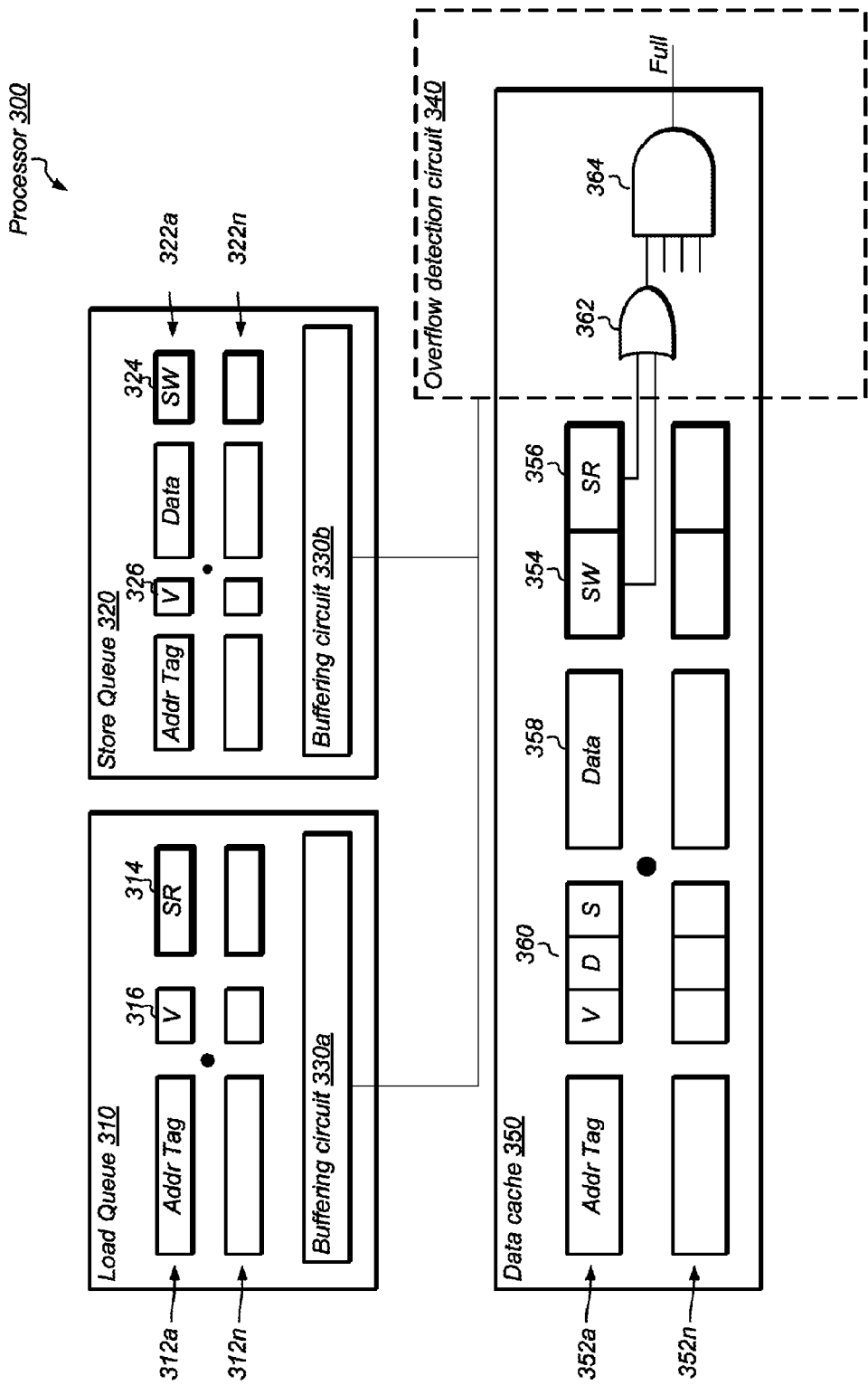
FIG. 3 is a block diagram illustrating the various components of a processor configured to utilize a plurality of cooperating transactional buffers, according to some embodiments.

FIG. 3 is a block diagram illustrating the various components of a processor configured to utilize a plurality of cooperating transactional buffers, according to some embodiments. FIG. 3 may be understood as a more specific example of processor 200 in FIG. 2. Processor 300 illustrates an embodiment with distinct load and store queues. However, given the benefit of this disclosure, those skilled in the art will appreciate that an analogous system may be designed using a combined load/store queue.

According to the illustrated embodiment, data cache 350 may include a plurality of cache blocks 352a-n. In some embodiments, each cache block may comprise and/or be otherwise associated with a unique, respective set of at least two bits: a SW (speculatively written) bit (such as 354) and an SR (speculatively read) bit (such as 356). In some embodiments, SW bit 354 may be set when the cache line is written by a store operation while SR bit 356 may be set when the cache line is read by a load operation.

In addition to SW and SR bits 354 and 356, each cache block 352 may further comprise various cache coherence and/or consistency flags, such as flags 360. For example, each of cache blocks 352a through 352n in cache 350 includes respective coherence and consistency flags, such as 360, which includes a valid flag (V), a dirty flag (D), and shared flag (S). The particular flags that are used may depend on various cache coherence protocols used to coordinate the values stored in caches on different processors (e.g., MESI protocol, MOESI, etc.). In addition, some flags (e.g., dirty flag D), may be used for informing write-back decisions. In various embodiments, different protocols may be employed by cache 350 for maintaining data coherence and consistency.

According to the illustrated embodiment, load queue 310 may comprise a plurality of entries 312a-312n, wherein each entry comprises or is otherwise associated with a respective SR flag 314, analogous to SR flag 356 in data cache 350. That is, SR flag 314 may be set to indicate whether the corresponding load instruction and/or address tag 312 is speculatively performed as part of an atomic transaction.

In some embodiments, the load queue may contain snooping logic (not shown) to detect and respond to cache coherence traffic received from other processors (i.e., cache coherence probes). Each entry 312a-312n of load queue 310 may further be associated with some number of cache coherence flags, such as valid flag 316.

According to the illustrated embodiment, store queue 320 may comprise a plurality of entries 322a-322n. As in store queue 320, each entry may include or be otherwise associated with a respective SW flag 324, which may be implemented as one or more bits. Additionally, store queue 320 may include any number of memory coherence bits, such as valid bit 326, which may be analogous to valid flag 316 and/or that of 360.

In some embodiments, the store queue may contain tag match logic (not shown) for performing load forwarding. That is, a load operation that attempts to load from an address to which a store operation still in store queue 320 has written, the new value may be forwarded to satisfy the load operation without waiting for the new value to be flushed to data cache 350.

In some embodiments, the store queue may also participate in the cache coherence protocol. As with load queue 310, entries in store queue 320 may be checked when various cache coherence probes are received by the processor. For example, in some embodiments, store queue 320 may be equipped with a read port to the tag match logic, making the store queue available for probe messages.

In some embodiments, processor 300 may include overflow detection circuit 340, which is usable, as described above, to determine whether data cache 350 has sufficient capacity to buffer a given portion of speculative data. For example, before flushing speculative data from store queue 320 into data cache 350, overflow detection circuit 340 may be consulted to determine if data cache 350 has sufficient capacity. In some embodiments, if data cache 350 has insufficient capacity, then buffering circuit 330b may be configured to buffer the given speculative data in store queue 320.

In another example, before buffering speculative data in data cache 350 from a memory address identified by an entry 312 of load queue 310, overflow detection circuit 340 may determine whether the data cache has sufficient capacity for buffering the speculative data. If not, then buffering circuit 300a may be configured to buffer the load operation and/or speculative data in load queue 310.

Overflow detection circuit 340 is shown in FIG. 3 using a dashed line to denote that some, all, or none of the components that constitute the circuit may be integrated into data cache 350. For example, in the illustrated embodiment, overflow detection circuit 340 may include various circuitry in data cache 350, such as OR gate 362 and AND gate 364. In some embodiments, overflow detection circuit 340 may include other elements not integrated with data cache 350.

In some embodiments, overflow detection circuit 340 may include combinational logic for detecting overflow conditions in data cache 350. In some embodiments, the combinational logic may determine whether a given associative set of the cache is already full with transactional data. For example, in processor 300, OR-gate 362 may be configured to test whether cache block 352a has been either read or written speculatively, as indicated by either SR flag 356 or SW flag 354 being set. If the data has been speculatively read or written, then it may be considered speculative data. In some embodiments, a respective OR-gate may be attached to each cache block and the output from the OR-gates of every block in an associative set may be combined into a single AND-gate, such as 364. Thus, in such a configuration, AND-gate 364 may output 1 if and only if the associative set to which block 352a belongs is full. If speculative data in load queue 310 or in store queue 320 is about to be flushed to a set of the data cache and the AND-gate associated with that set indicates that the set is already full of speculative data, then overflow detection circuit 340 may detect an overflow condition since the data cache has insufficient capacity to buffer the speculative data.

In response to the detection of an overflow condition load queue 310 and store queue 320 may be configured to buffer speculative memory access operations. According to the illustrated embodiment, each of load queue 310 and store queue 320 comprise a buffering circuit 330. In various embodiments, each buffering circuit may be implemented as part of or as separate from its respective queue. In various embodiments, buffering circuits 330 may communicate with overflow detection circuit 340 to detect an overflow condition before flushing speculative data to the data cache. In some embodiments, in response to determining that data cache 350 has insufficient capacity to buffer given speculative data, a buffering circuit may be configured to buffer the speculative data in its respective queue.

For example, in some embodiments, transactional stores may be buffered in a store queue entry and the SW bits of each entry set. When the store is ready to be retired (e.g., is at the head of the store queue and ready to be flushed to cache), buffering circuit 330B and/or other mechanisms (e.g., circuits) may be configured to utilize overflow detection circuit 340 to determine whether an overflow condition exists. Overflow detection circuit 340 may check whether the cache already contains the target memory address of the store operation. If the target memory address is in cache, then the new value may be flushed and/or the corresponding SW flag of the target cache block may be set. This is because flushing the data to cache in this situation would not cause an eviction.

If the target memory address is not in cache, overflow detection circuit 340 may determine whether adding it to the cache would cause an eviction (e.g., the cache set for the target memory address is full). In some embodiments, if there is no cache line with the matching address tag already resident in the cache and the target associative set is full (e.g., every entry contains speculative data of an active transaction), then buffering circuit 330b may ensure that the store remains in the store queue instead of being executed (i.e., instead of being flushed to the cache), since flushing the store would cause a transactional buffer overflow. Otherwise, if sufficient capacity exists in the cache, then the store may be flushed to the cache as usual.

A similar process may be performed before attempting to flush speculative values from load queue 310 to data cache 350. A transactional load may be buffered in a load queue entry and the SR bit of the entry set. In some embodiments, the same two conditions may be checked for the load when it retires. If there is no block in cache 350 with the matching address tag and the associative set of the cache is full, then to avoid buffer overflow, buffering circuit 330a may facilitate buffering the load in load queue 310 instead of de-allocating the load. According to some embodiments, buffered store values in the store queue or in the cache may be read by subsequent loads through the logic for load forwarding and cache hit.

In some embodiments, buffer overflow may occur when there are no more entries to buffer transactional data in the load queue and/or the store queue. For example, in an embodiment utilizing a 32K byte 4-way set-associative cache, 24-entry store queue, and 32-entry load queue, the minimum guarantee may be (4+24) bytes in the worst case (e.g., a transaction that only writes at the additional hardware storage cost of 7 Bytes from (32 bits+24 bits)/8).

In various embodiments, a transaction conflict may be detected using the snooping logic in the load queue, the store queue, and/or in the cache. When an invalidating probe message arrives (according to the cache coherence protocol), the load queue, the store queue, and the cache may be checked to determine if there exists a queue entry or a cache block with the matching address tag. If there is a matching entry/cache line and its SW bit or SR bit is set, the current transaction may be determined to conflict with the probe message. In some embodiments, if a non-invalidating probe message arrives, the store queue and the cache may be checked in the same way. In this case, if a matching entry/cache block exists and its SW bit is set, the current transaction may be determined to conflict with the probe message.

Figure 4:
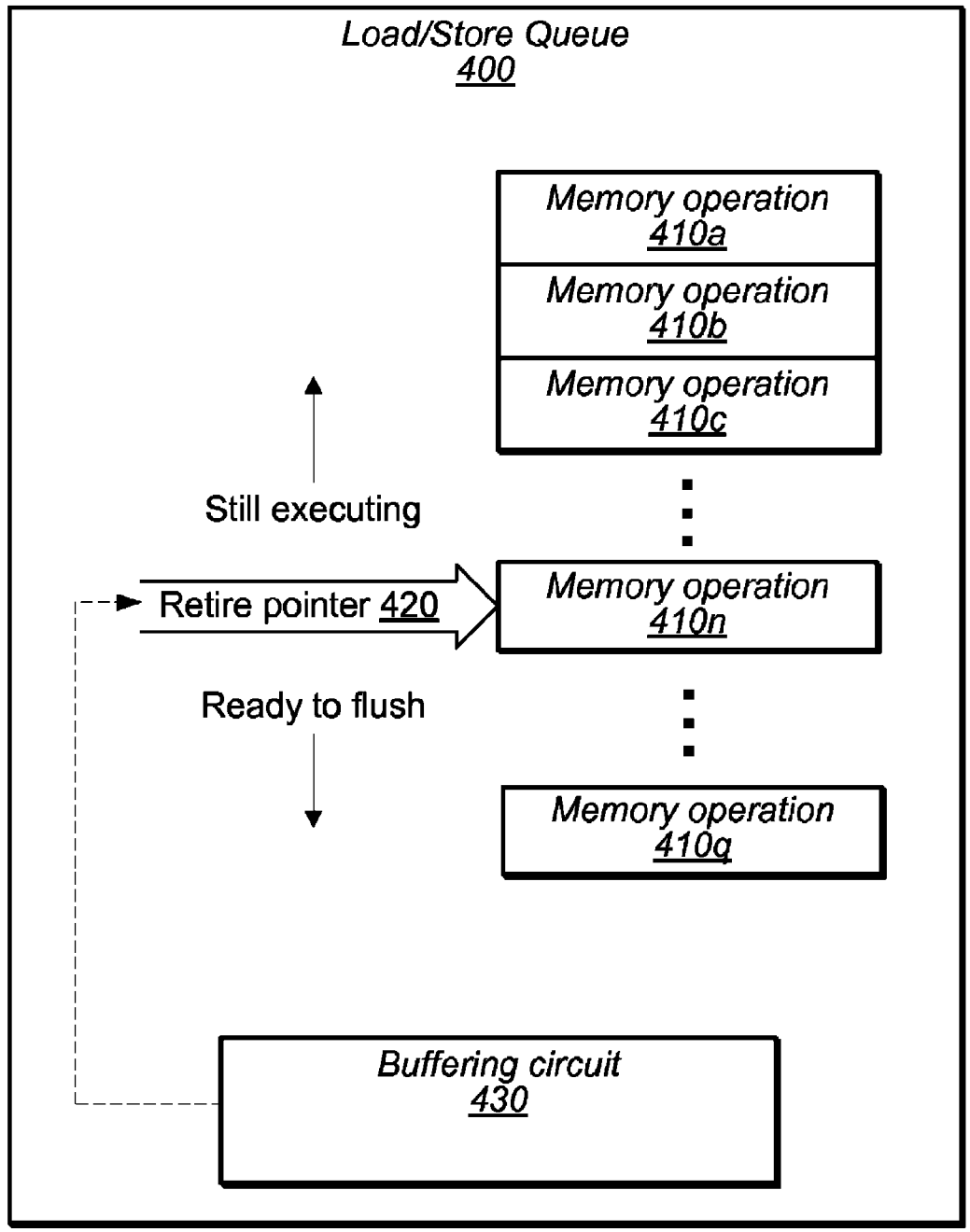
FIG. 4 is a block diagram illustrating the components of a load/store queue that includes a buffering circuit configured to buffer speculative data in the load/store queue, according to some embodiments.

FIG. 4 is a block diagram illustrating the components of a load/store queue that includes a buffering circuit configured to buffer speculative data in the load/store queue, according to some embodiments. In this embodiment, load/store queue 400 may implement the functionality of either or both of load queue 310 and store queue 350.

Load/Store queue 400 comprises a plurality of ordered memory operations 410a-410n. In some embodiments, the queue of operations may be segmented into sections using various pointers, such that the memory operations in each section are at a given stage or set of stages of their respective executions. In some systems, a retire pointer, such as 420, may be used to separate the memory operations into those that have reached a given stage of execution in the processor's execution pipeline (e.g., ready to be retired and have their results flushed to cache) and those that have not. This separation is noted in FIG. 4 by applying the "still executing" labeling to all entries at or above retire pointer 420 and the "ready to flush" label of all memory operations below the pointer.

In some embodiments, when a memory operation pointed to by retire pointer 420 is completed, the retire pointer is incremented (i.e., moved up in the diagram) to point to the next memory operation. In some systems, the processor may occasionally examine the load/store queue and flush the results of each memory operation that is below retire pointer 420 to the data cache. That is, since these operations have already been executed, the result may be flushed to shared memory.

In some embodiments, load/store queue 400 may include buffering circuit 430, which may be analogous to buffering circuits 330 in processor 300. In some embodiments, incrementing retire pointer 420 may be contingent not only on the execution status of the memory operation pointed at by retire pointer 420 (e.g., completed versus not completed) but also on input from buffering circuit 430. This dependency is denoted in FIG. 4 by the dashed arrow from buffering circuit 430 to retire pointer 420.

In some embodiments, the buffering circuit 430 may ensure that when retire pointer 420 points to a completed memory access operation, the pointer may not be incremented if the data cache has insufficient capacity to buffer the results of the speculative operation. In some embodiments, buffering circuit 430 may check and/or otherwise utilize an overflow detection circuit such as 340 to determine whether an overflow condition exists. If so, then buffering circuit 430 may prevent retire pointer 420 from being incremented, effectively preventing the memory operation pointed to by retire pointer 420 from being flushed to the data cache. Thus, the speculative memory operation may be buffered in the load/store queue until the transaction commits. Furthermore, since the pointer may not be incremented, subsequent memory access operations in the queue may also be buffered in the queue until the transaction completes.

Some transactional memory instruction sets, such as AMD ASF (Advanced Synchronization Facility), allow a transaction to include a mixture of transactional access and non-transactional access to memory locations. In some embodiments, a non-transactional access may also be prevented from being flushed from the load/store queue into cache if the target set in the data cache has insufficient capacity to hold it (e.g., is already full of transactional data, some of which would have to be evicted to make room for data from the non-transactional access).

Figure 5:
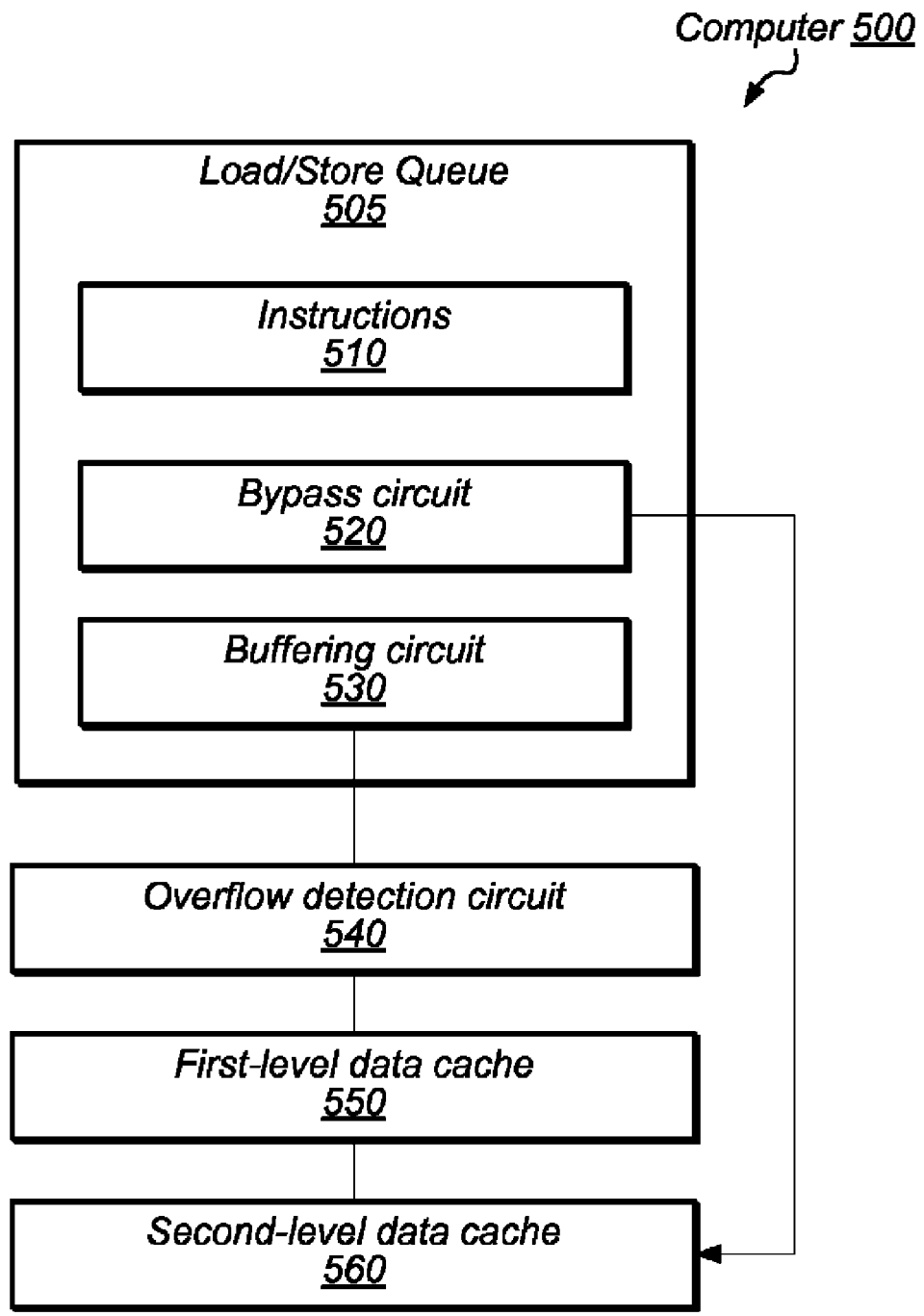
FIG. 5 is a block diagram illustrating various components of a computer system configured to implement cooperative speculative buffering and a bypass mechanism for non-speculative memory operations, according to some embodiments.

In some embodiments, however, a bypass mechanism may be implemented to allow a non-transactional memory load operation to retire, despite the target associative set in the data cache being full. FIG. 5 is a block diagram illustrating various components of a computer system configured to implement cooperative speculative buffering and a bypass mechanism for non-speculative memory operations, according to some embodiments.

According to the illustrated embodiment, computer 500 comprises load/store queue 505, overflow detection circuit 540, first-level data cache 550, and second-level data cache 560. In some embodiments, load/store queue 505 may be analogous in purpose and/or function to load/store queue 505 and overflow detection circuit 540 to overflow detection circuit 340. Furthermore, first-level data cache 550 may be analogous in purpose and/or function to data cache 350. For example, first-level data cache 550 may be implemented as an on-chip L1 cache and second-level data cache 560 may be implemented as an on or off-chip L2 cache. Thus, second-level data cache 560 may be at a higher level of the cache hierarchy than is first-level cache 550. In various embodiments, data in first-level data cache 550 maybe written through or written back to second-level cache 560, depending on the particular implementation of the cache hierarchy.

In the illustrated embodiment, load/store queue 505 contains a plurality of instructions 510 and a buffering circuit 530 (analogous to buffering circuits 330 and 430 described above). In addition, load/store queue 505 may include bypass circuit 520. In some embodiments, bypass circuit 520 may be configured to allow data from various ones of instructions 510 to be flushed directly to second-level data cache 560 rather than to first-level data cache 550. In various embodiments, bypass circuit may be implemented as part of or separate from buffering circuit 530 and/or load/store queue 505.

In some embodiments, where a transaction can mix both speculative and non-speculative instructions, bypass circuit 520 may allow data from a non-speculative instruction to be flushed to second-level data cache 560. For example, if buffering circuit 530 and/or overflow detection circuit 540 detect an overflow condition that prevents data from various ones of instructions 510 from being flushed to first-level data cache 530, then various instructions may be buffered in load/store queue 505 as described above. However, in this case, a given non-speculative instruction may still be flushed from load/store queue 505 to second-level data cache 560 via bypass circuit 520. Thus, non-speculative memory access operations may be flushed from load/store queue 505, thereby freeing more entries in load/store queue 505 for buffering other memory access operations (e.g., speculative instructions).

In some embodiments, a compiler may generate efficient program code that is configured to reuse the values loaded in registers in many cases.

Figure 6:
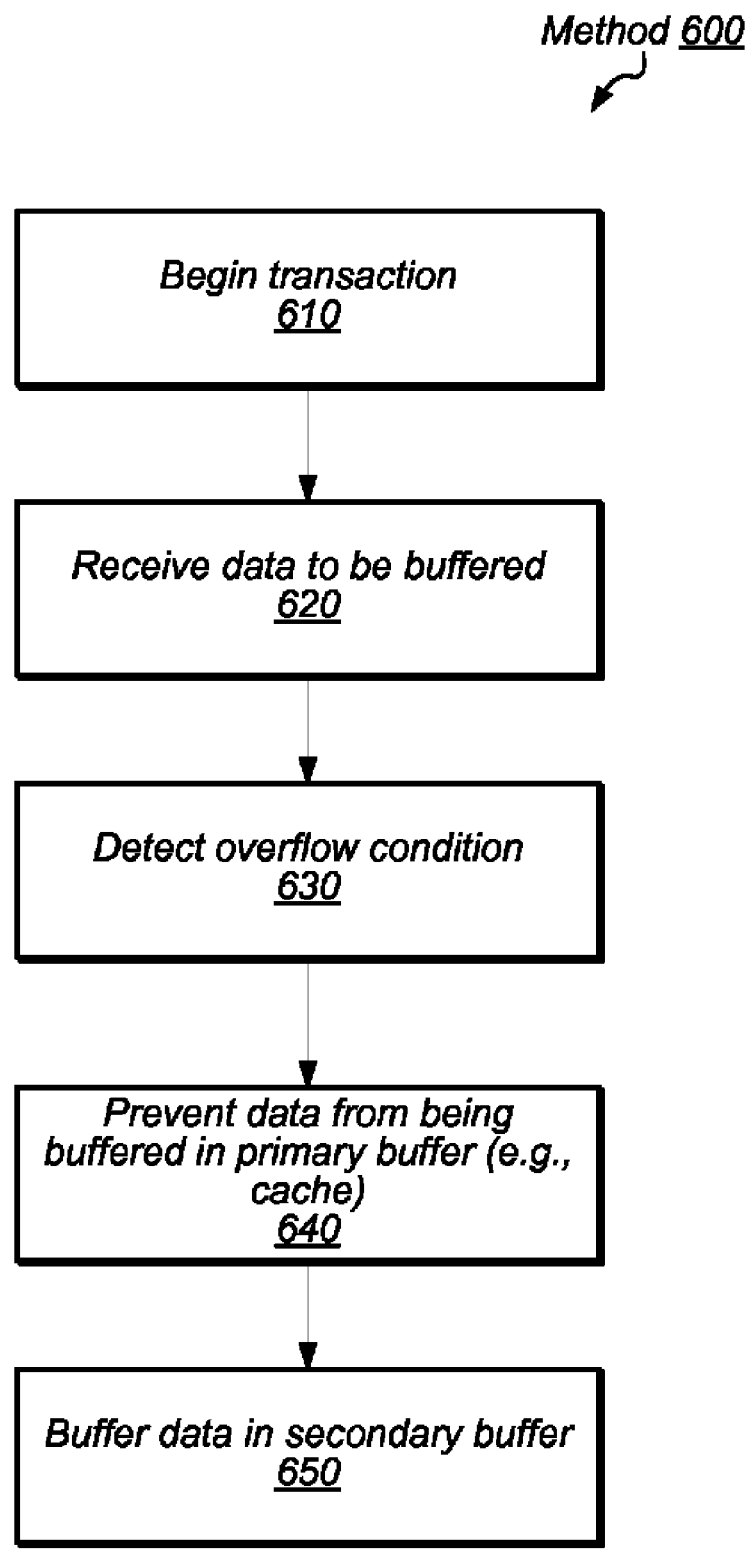
FIG. 6 is a flow diagram illustrating a general method for implementing multi-level transactional buffering, according to some embodiments.

FIG. 6 is a flow diagram illustrating a general method for implementing multi-level transactional buffering, according to some embodiments. Method 600 begins by beginning a transaction, as in 610. During the execution of the transaction, the method comprises receiving data to be buffered, as in 620. In some instances, the data to be buffered may be speculative data accessed by one or more speculative memory access operations of the transaction. In other instances, the data to be buffered may be non-speculative data. In some embodiments, data to be buffered may be non-speculative because it has not been accessed by any speculative memory access operations of the transaction.

According to the illustrated embodiment, method 600 includes detecting an overflow condition, as in 630. Such a condition may be detected upon determining that a primary buffer, such as a data cache, has insufficient capacity to buffer the speculative data. In response to detecting the overflow condition, as in 630, the method comprises preventing data from being buffered in the primary buffer (e.g., in the data cache), as in 640. Instead, the data is buffered in a secondary buffer (e.g., a load/store queue), as in 650.

Figure 7:
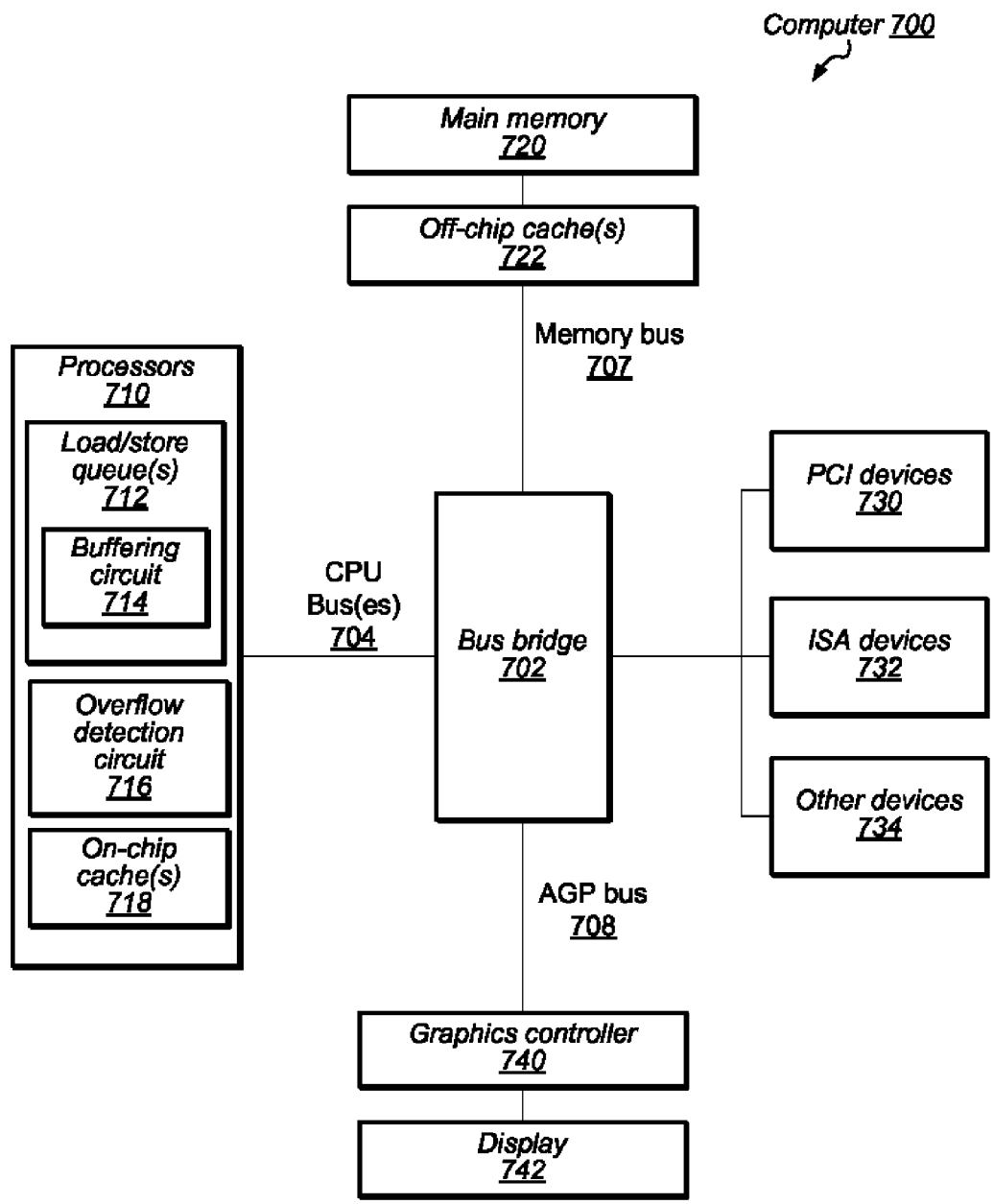
FIG. 7 is a block diagram depicting one embodiment of a computer system that may implement the transactional buffering functionality described herein, according to some embodiments.

The functionality described herein, including the cooperative, multi-level transactional buffer designs, protocols, and various features thereof, may be implemented within a variety of specific computer system architectures, as desired. FIG. 7 is a block diagram depicting one embodiment of a computer system 700 that may implement the transactional buffering functionality described herein, according to come embodiments. FIG. 7 may include a plurality of processors 710, each coupled to one another and a shared memory 720. Each processor may comprise load/store queue(s) 712, overflow detection circuits 716, and one or more on-chip cache(s) 718 as described herein. Load/store queues 712 may include one or more buffering circuit(s) 714 for buffering speculative data in load/store queues 712. Speculative data may also be cached in on-chip caches 718, as described herein. Processors 710 may include various other HTM mechanisms for implementing transactional memory.

According to the illustrated embodiment, processors 710 may be coupled to a variety of system components through a bus bridge 702 as shown. Processors 710 may be couple to bridge bus 702 by one or more CPU buses 704. Bus bridge 702 may includes two or more distinct integrated circuits, in some embodiments.

In computer system 700, a main memory 720 is coupled to bus bridge 702 through a memory bus 706. Various levels of off-chip caches 722 may be coupled to main memory 720 for caching data for fast access. Caches 722 may be separate from processors 710, integrated into a cartridge (e.g. slot 1 or slot A) with processors 710, or in alternate embodiments, even integrated onto a semiconductor substrate with one or more of processors 710.

A graphics controller 740 may also be coupled to bus bridge 702 as shown, through an AGP bus 708. Graphics controller 740 may be coupled to one or more displays 742 and may be use to drive such displays. Various other PCI devices 730, ISA devices 732, and/or other devices 734 (e.g., mouse, keyboard) may be coupled to bus bridge 702 through various other buses (e.g., PCI bus).

Bus bridge 702 may be configured to provide an interface between processors 710, main memory 720, graphics controller 740, and devices 730-634. When an operation is received from one of the devices connected to bus bridge 702, bus bridge 702 may identify the target of the operation and to route the operation to the targeted device. Bus bridge 702 may translate an operation from the protocol used by the source device or bus to the protocol used by the target device or bus.

In some embodiments, an external cache unit (not shown) may further be coupled to CPU bus 704 between processors 710 and bus bridge 702. Alternatively, an external cache may be coupled to bus bridge 702 and cache control logic for the external cache may be integrated into bus bridge 702.

Main memory 720 is a memory in which application programs and/or data structures may be stored. Main memory 720 may be shared among processors 710 and may store program instructions executable by processors 710 and/or data structures by processors 710 during execution. A suitable main memory 720 may comprise DRAM (Dynamic Random Access Memory). For example, a plurality of banks of SDRAM (Synchronous DRAM), double data rate (DDR) SDRAM, or Rambus DRAM (RDRAM) may be suitable. In one embodiment, main memory 720 may store code executable by processor 710 to implement the functionality as described herein.

PCI devices 730 are illustrative of a variety of peripheral devices. The peripheral devices may include devices for communicating with another computer system to which the devices may be coupled (e.g. network interface cards, modems, etc.). Additionally, peripheral devices may include other devices, such as, for example, video accelerators, audio cards, hard or floppy disk drives or drive controllers, SCSI (Small Computer Systems Interface) adapters and telephony cards. Similarly, ISA devices 732 are illustrative of various types of peripheral devices, such as a modem, a sound card, and a variety of data acquisition cards such as GPIB or field bus interface cards.

Graphics controller 740 may be provided to control the rendering of text and images on a display 742. Graphics controller 740 may embody a typical graphics accelerator generally known in the art to render three-dimensional data structures, which can be effectively shifted into and from main memory 720. Graphics controller 740 may be a master of AGP bus 708 in that it can request and receive access to a target interface within bus bridge 702 to obtain access to main memory 720. A dedicated graphics bus may accommodate rapid retrieval of data from main memory 720. For certain operations, graphics controller 740 may further be configured to generate PCI protocol transactions on AGP bus 708. The AGP interface of bus bridge 702 may therefore include functionality to support both AGP protocol transactions as well as PCI protocol target and initiator transactions. Display 742 is any electronic display upon which an image or text can be presented. A suitable display 742 includes a cathode ray tube ("CRT"), a liquid crystal display ("LCD"), etc.

It is noted that, while various buses have been used as examples in the above description, any bus architectures may be substituted as appropriate. It is further noted that computer system 700 may be a multiprocessing computer system including additional processors. Each processor 710 may be connected to bus bridge 702 via an independent bus or may share CPU bus 704 with other processors 710. Furthermore, each processor 710 may be coupled to respective higher-level caches, which may be used by bypass mechanisms, as described herein.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed:

1. An apparatus for executing an atomic memory transaction comprising a plurality of speculative memory access operations as a single atomic transaction, said apparatus comprising:
 a data cache configured to buffer data accessed at respective locations in a shared memory by respective ones of the plurality of speculative memory access operations and to retain the data during at least a portion of an attempt to execute the atomic memory transaction, wherein the shared memory is shared by a plurality of processing cores;
 an overflow detection circuit configured to detect an overflow condition upon determining that the data cache has insufficient capacity to buffer a portion of data accessed as part of the atomic memory transaction; and
 a buffering circuit configured to respond to the detection of the overflow condition by buffering the portion of data in an instruction queue of a processor rather than in the data cache, wherein the buffering comprises preventing an instruction from being retired.

2. The apparatus of claim 1, wherein buffering the portion of data in the instruction queue comprises preventing a result of an instruction in the instruction queue from being flushed to the data cache.

3. The apparatus of claim 2, wherein buffering the portion of data in the instruction queue comprises preventing a pointer value of the instruction queue from being modified, wherein the pointer value indicates instructions in the data cache that have reached a particular stage in an execution pipeline of one of the plurality of processing cores.

4. The apparatus of claim 1, wherein the overflow detection circuit is configured to detect an overflow condition in response to detecting that:
 each of a set of cache blocks in which the data cache is configured to buffer the portion of data already contains data accessed by at least one other of the plurality of speculative memory access operations; and
 none of the set of cache blocks is already buffering data from the respective memory location where the portion of data was accessed.

5. The apparatus of claim 1, wherein two or more of the plurality of processing cores are on the same computer processor.

6. The apparatus of claim 1, wherein the apparatus includes a circuit configured to receive a cache coherence message from one of the plurality of processing cores and to determine whether the cache coherence message indicates a memory area from which the portion of data was accessed.

7. The apparatus of claim 1, wherein the apparatus is configured to commit the transaction, including by writing the portion of data to the shared memory.

8. The apparatus of claim 1, wherein the buffering circuit is configured to detect whether another portion of data was accessed by a non-speculative memory access operation of the transaction and if so, to buffer the another portion of data in a second data cache that is at a higher-level of a cache hierarchy than is the data cache.

9. A method, comprising:
 a first processing core of a plurality of processing cores executing an atomic memory transaction comprising a plurality of speculative memory access operations, wherein the plurality of processing cores are coupled to a shared memory, wherein said executing comprises:
 storing, in a data cache, data accessed at respective locations in the shared memory by each of the plurality of speculative memory access operations;
 detecting an overflow condition upon determining that the data cache has insufficient capacity to buffer a given portion of the data accessed as part of the atomic memory transaction; and
 in response to said detecting, preventing the portion of data from being buffered in the data cache and buffering the portion of data in an instruction queue of the first processing core rather than the data cache, wherein the instruction queue is configured to store in-flight program instructions.

10. The method of claim 9, wherein the instruction queue is a load, store, or load/store queue of the first processing core.

11. The method of claim 10, wherein buffering the portion of data in the instruction queue comprises retaining a memory instruction in the queue and not flushing the result of the memory instruction to the data cache.

12. The method of claim 11, wherein said retaining comprises preventing a pointer value of the queue from being modified, wherein the pointer value is usable by the first processing core to determine which of a plurality of memory operations in the queue has reached a given stage of execution in an execution pipeline of the processing core.

13. The method of claim 9, wherein said detecting an overflow condition is dependent on detecting that all cache blocks in an associative set in which the data cache is configured to buffer the given portion of data already store other speculative data.

14. The method of claim 9, further comprising determining whether a cache coherence message indicates a memory area associated with the portion of data.

15. The method of claim 14, further comprising:
   determining that the cache coherence message indicates that another one of the plurality of processing cores has written to a memory location from which the portion of data was read; and
   in response to said determining, aborting the transaction.

16. The method of claim 9, further comprising: detecting that another portion of data accessed by the transaction was not accessed by a speculative memory access operation of the transaction, and, in response, buffering the another portion of data as non-speculative data in a secondary buffer implemented as part of a second data cache that is at a higher level of a cache hierarchy than is the data cache.

17. A system, comprising:
   a memory;
   a plurality of processing cores, each of which is coupled to the memory, the plurality of processing cores comprising a first processing core that includes a buffering circuit, wherein the buffering circuit is configured to:
      detect whether a primary data buffer has insufficient capacity to buffer a given portion of data because a set of locations of the primary data buffer already contain transactional data that has been accessed by an active atomic memory transaction being executed by the first processing core; and
      in response to the buffering circuit detecting that the primary data buffer has insufficient capacity, buffer the given portion of data in an instruction queue of the first processing core rather than in the primary data buffer, wherein the buffering comprises preventing the portion of data from being flushed from the instruction queue to the primary data buffer.

18. The system of claim 17, wherein the primary data buffer is implemented by a first-level data cache of the system, and wherein the secondary data buffer comprises a load queue, store queue, or load/store queue.

19. The system of claim 17, wherein the buffering circuit is further configured to respond to determining that another portion of data has been accessed by a non-speculative memory access operation of the active atomic memory transaction by utilizing a bypass circuit to buffer the another portion of data in a second data cache, wherein the second data cache is at a higher level of a memory hierarchy than is the data cache.

20. The system of claim 17, wherein the first processing core is further configured to determine whether a cache coherence message from another of the plurality of processing cores indicates a memory area from which the portion of data buffered in the instruction queue was accessed.

* * * * *